No. 748,741.

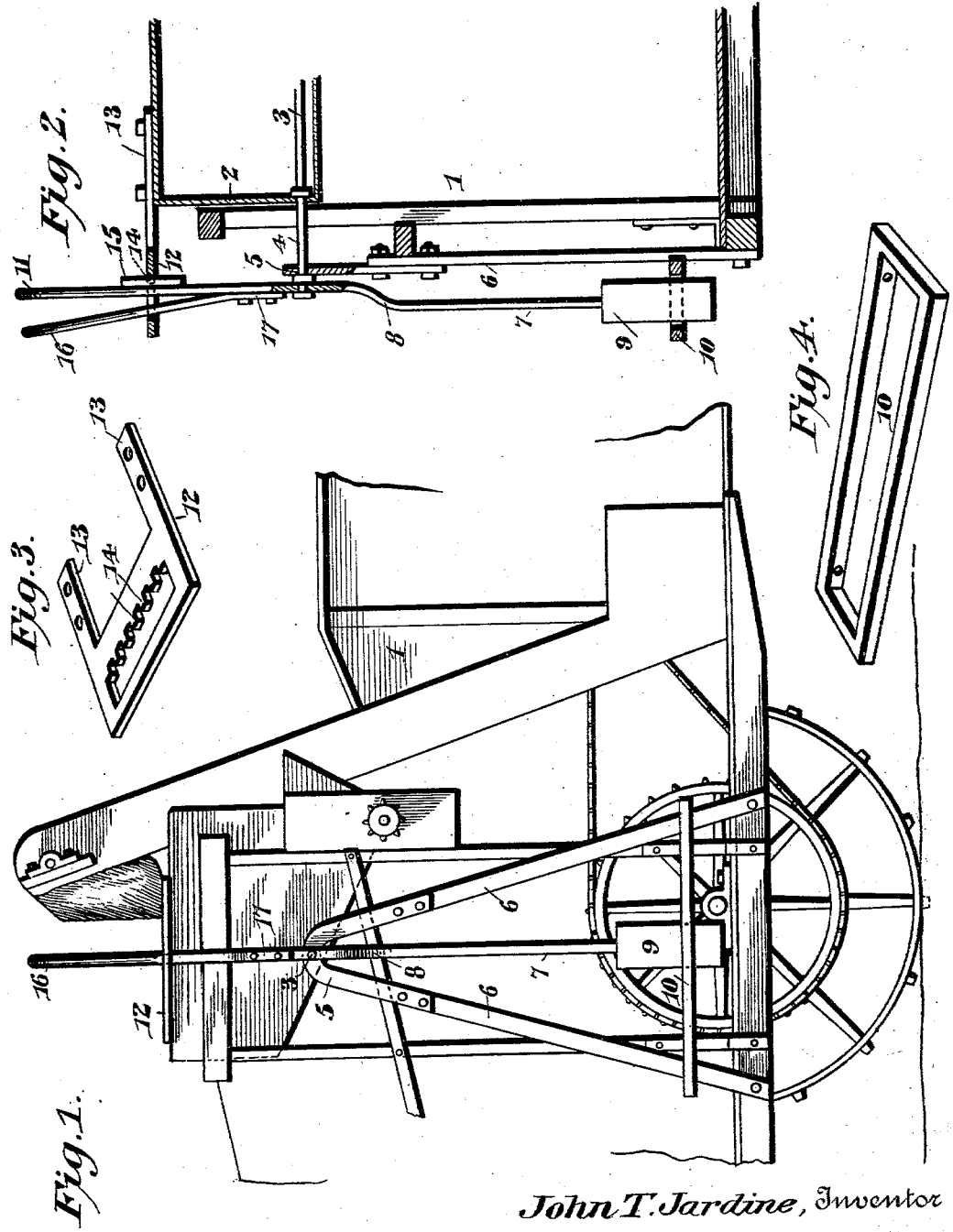

Patented January 5, 1904.

UNITED STATES PATENT OFFICE.

JOHN T. JARDINE, OF PASO ROBLES, CALIFORNIA.

SELF-ADJUSTING GRAIN-SHOE.

SPECIFICATION forming part of Letters Patent No. 748,741, dated January 5, 1904.

Application filed December 6, 1902. Serial No. 134,124. (No model.)

*To all whom it may concern:*

Be it known that I, JOHN T. JARDINE, a citizen of the United States, residing at Paso Robles, in the county of San Luis Obispo and State of California, have invented a new and useful Self-Adjusting Grain-Shoe, of which the following is a specification.

The invention relates to combined harvesters and grain-separators which have tiltable shoes; and the object of the invention is to provide improved means for maintaining the shoe automatically in a predetermined position when the machine is ascending and descending inclines.

A further object of the invention is to provide for quickly and conveniently changing such position of the shoe to vary the inclination thereof and for enabling the shoe to be set at any desired inclination.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a portion of a combined harvester and grain-separator provided with an automatic shoe constructed in accordance with this invention. Fig. 2 is a vertical sectional view thereof. Fig. 3 is a detail perspective view of the rack. Fig. 4 is a detail perspective view of the guide for the counterweight.

Like characters of reference designate corresponding parts in all the figures of the drawings.

To adequately illustrate the application and operation of the present invention, I have shown in the accompanying drawings a portion of the frame 1 of a combined harvester and grain-separator which is adapted to be driven through a field and successively cut the heads of the grain, convey the same to the threshing apparatus where the grain is separated, thence to carry the grain to the cleaning apparatus, and, finally, discharge the grain into bags. In such a machine it is necessary to adjust the shoe when ascending and descending hills in order that it may be maintained in a predetermined relation with respect to the blower or blast apparatus, and thereby to prevent the grain from running over at one end of the shoe or being blown out of the shoe by the force of the blast, and therefore it is an essential object of the present invention to provide for automatically maintaining the shoe in a predetermined relation with respect to the blower, which object is carried out in the following manner:

The casing 2 of the shoe is commonly carried by a rotatable rod or rock-bar 3, which is journaled in the main frame of the machine, and in order that the present automatically-operating device may be connected thereto one end of the rock-bar is projected beyond one side of the main frame, as indicated at 4, with its outer end portion journaled in a bearing 5, carried by the upper ends of the braces 6, which incline upwardly and toward each other and rise from the base or main platform of the machine. A pendulum 7 is intermediately connected to the outer end of the rock-bar and at the outer sides of the braces 6, with its upper end projected above the top of the shoe. It will of course be understood that the connection between the pendulum and the rock-bar is loose in order that the former may be adjusted upon the latter. Just below the rock-bar the pendulum is bent outwardly, as at 8, so as to offset the lower portion of the pendulum at the outer sides of the braces 6 in order that there may be a free and unobstructed path for the counterweight 9, carried by the lower end of the pendulum. To guide the pendulum in its swinging movement, there is a horizontally-disposed longitudinal-slotted guide-frame 10, which is secured to the braces 6, with the counterweight working in the slot thereof.

The upper end portion of the pendulum, which rises above the top of the shoe, is formed into a handle 11 and works in the slot of a horizontally-disposed guide-frame 12, having laterally-projected arms 13, which are secured to the top of the shoe-frame. The inner edge of the slot of the frame or bracket 12 is provided with teeth 14 to form a rack, and the inner side of the handle 11 is provided with a tooth or projection 15 to adjustably engage the rack 14. An upstanding spring-arm 16 has its lower end secured to the outer side of the pendulum at a point below the guide 14, as indicated at 17, with its upper portion rising through the slot of the guide-bracket, inclined outwardly from the pendulum, and frictionally bearing against the outer smooth edge of the slot, so as to yieldably hold the tooth or projection 15 in engagement with the rack 14, whereby the pendulum may be adjustably connected to the cleaner.

When it is desired to maintain the grain-shoe in a relatively horizontal position, the handle of the pendulum is engaged with the middle notch of the rack 14, and when the machine is passing up or down an incline the shoe will be automatically shifted under the influence of the counterweight or pendulum, so as to be maintained in a relatively horizontal position. Should it be desired to have the shoe maintained in an inclined position, the handle is engaged with one of the other notches of the rack, according to the inclination desired, and as the counterweight or pendulum always assumes a vertical position the shoe will consequently be maintained in an inclined position.

What is claimed is—

1. In a combined harvester and grain-separator, the combination with a tiltable shoe, of an automatically-operating device therefor, said shoe and device having a common pivotal point, and means for adjustably connecting them, whereby the device may maintain the shoe at any predetermined inclination.

2. In a combined harvester and grain-separator, the combination with a tiltable shoe, of an automatically-operating device therefor, said device and shoe having a common pivotal point, and means for adjustably interlocking the former to different points of the latter for automatically maintaining the shoe in any predetermined inclined position.

3. In a combined harvester and grain-separator, the combination with a tiltable shoe, pivoted at the bottom, of an automatically-operating device therefor embodying a pendulum depending below the shoe and fulcrumed independently of the same and in longitudinal alinement with the axis thereof and also adjustably connected with the shoe.

4. In a combined harvester and grain-separator, the combination with a tiltable shoe, of a pendulum fulcrumed independently of the shoe and in longitudinal alinement with the axis of the same and connected with the shoe above the pivotal point thereof.

5. In a combined harvester and grain-separator, the combination with a tiltable shoe, of an automatically-operating device therefor embodying a pendulum having an adjustable connection with the shoe and fulcrumed independently thereof and in longitudinal alinement with the axis of the tiltable movement of the shoe.

6. In a combined harvester and grain-separator, the combination with a tiltable shoe, of an automatically-operating device therefor embodying a pendulum fulcrumed independently of the cleaner, a rack carried transversely by the shoe, and means carried by the pendulum for adjustable engagement with the rack, whereby the shoe may be maintained in any predetermined relatively inclined position.

7. In a combined harvester and grain-separator, the combination with a tiltable shoe, of an automatically-operating device therefor embodying a pendulum fulcrumed intermediately and independently of the shoe, a substantially horizontal rack carried by the shoe and disposed transversely thereof, and a projection carried by the upper end portion of the fulcrum for adjustable engagement with the rack.

8. In a combined harvester and grain-separator, the combination with a tiltable shoe, of an automatically-operating device therefor embodying an intermediately-fulcrumed pendulum, a slotted bracket carried by the shoe and receiving the upper end of the pendulum, one side of the slot in the bracket being smooth and the other side being notched to form a rack, an upstanding spring-arm carried by the pendulum, one of these two members frictionally engaging the smooth edge of the slot, and a projection carried by the other member and disposed for adjustable engagement with the rack.

9. In a combined harvester and grain-separator, the combination with a tiltable shoe, and a rock-bar forming the pivotal support therefor, of a pendulum loosely fulcrumed upon the bar and having an adjustable connection with the shoe.

10. In a combined harvester and grain-separator the combination with a tiltable shoe and a rock-bar forming the tiltable support therefor, of a pendulum loosely fulcrumed intermediate of its ends upon the rock-bar, and an adjustable connection between the upper end portion of the pendulum and the shoe.

11. In a combined harvester and grain-separator, the combination with a tiltable shoe, of an automatically-operating device therefor embodying a pendulum loosely fulcrumed upon the shoe and also having an adjustable connection therewith.

12. In a combined harvester and grain separator, the combination with a shoe, of an automatically-operating device therefor embodying a pendulum loosely fulcrumed upon the shoe, a rack carried by the shoe, and means carried by the pendulum for adjustable engagement with the rack.

13. In a combined harvester and grain-separator, the combination with the frame thereof, of a tiltable shoe, a rock-bar carried by the frame and forming the tiltable support for the shoe, one end of the rock-bar being projected beyond the frame, a support rising from the platform of the frame and receiving the projected end portion of the rock-bar, a pendulum loosely and intermediately fulcrumed upon the projected end portion of the rock-bar, a slotted guide carried by the support and receiving the lower end portion of the pendulum, a slotted bracket receiving the upper end portion of the pendulum, one edge of the slot in the bracket being notched to form a rack, a projection carried by the upper end portion of the pendulum for adjustable engagement with the rack, and an upstanding spring-arm carried by the pendulum and frictionally bearing against the opposite edge of the slot in the bracket.

In testimony that I claim the foregoing as my own I have hereto affixed my signature in the presence of two witnesses.

JOHN T. JARDINE.

Witnesses:
F. L. HARDINBURGH,
T. W. ELDER.